United States Patent
Ritz

(10) Patent No.: US 8,353,796 B2
(45) Date of Patent: Jan. 15, 2013

(54) SPROCKET WITH ALTERNATING PITCH SPACING

(75) Inventor: Andreas Ritz, Munich (DE)

(73) Assignee: iwis motorsysteme GmbH & Co. KG, Munich (DE)

( * ) Notice: Subject to any disclaimer, the term of this patent is extended or adjusted under 35 U.S.C. 154(b) by 708 days.

(21) Appl. No.: 12/374,742

(22) PCT Filed: Apr. 26, 2007

(86) PCT No.: PCT/EP2007/003695
§ 371 (c)(1),
(2), (4) Date: Oct. 20, 2009

(87) PCT Pub. No.: WO2008/011924
PCT Pub. Date: Jan. 31, 2008

(65) Prior Publication Data
US 2010/0048337 A1    Feb. 25, 2010

(30) Foreign Application Priority Data

Jul. 25, 2006 (DE) .......................... 10 2006 034 364

(51) Int. Cl.
*F16H 7/06* (2006.01)
(52) U.S. Cl. ........................................ 474/155; 474/152
(58) Field of Classification Search .................. 474/152, 474/155
See application file for complete search history.

(56) References Cited

U.S. PATENT DOCUMENTS

| | | | |
|---|---|---|---|
| 6,213,905 B1 * | 4/2001 | White et al. .................. | 474/148 |
| 6,595,603 B2 * | 7/2003 | Rutz et al. ..................... | 305/199 |
| 7,691,020 B2 * | 4/2010 | Sakura et al. ................. | 474/156 |
| 7,699,733 B2 * | 4/2010 | Sakura et al. ................. | 474/161 |
| 8,062,158 B2 * | 11/2011 | Nakano et al. ................ | 474/141 |
| 8,066,601 B2 * | 11/2011 | Nakano et al. ................ | 474/141 |
| 2003/0087714 A1 * | 5/2003 | Todd ............................. | 474/156 |

FOREIGN PATENT DOCUMENTS

| | | |
|---|---|---|
| DE | 43 31 482 A1 | 3/1994 |
| DE | 203 19 172 U1 | 5/2004 |
| DE | 10 2005 008 676 A1 | 6/2006 |
| EP | 1065408 A2 | 1/2001 |
| EP | 1 308 646 A2 | 5/2003 |
| JP | 57-63140 | 4/1982 |
| JP | 02-53559 | 4/1990 |
| JP | 2001-32894 | 2/2001 |
| WO | WO 03/048604 A2 | 6/2003 |
| WO | WO 2005-026583 A1 | 3/2005 |
| WO | WO 2006/042412 A1 | 4/2006 |

OTHER PUBLICATIONS

Notification of Reason for Rejection, issued in JP Patent Application No. 2009-521115; dated Aug. 15, 2011, 5 pages.

* cited by examiner

*Primary Examiner* — Michael Mansen
*Assistant Examiner* — Michael Riegelman
(74) *Attorney, Agent, or Firm* — Leydig, Voit & Mayer, Ltd.

(57) ABSTRACT

The present invention relates to a sprocket (1) with a circular gear ring (3) comprising a plurality of alternating teeth (4) and tooth spaces (5) with different pitch spacings (T) distributed around the periphery of the gear ring (3), a plurality of successive pitch spacings (T) increasing continuously over a first region of the gear ring (3), and a plurality of successive pitch spacings (T) decreasing continuously in a subsequent region. The invention additionally relates to a chain drive (20), in particular a timing chain drive, comprising a driving chain (14) and at least one sprocket (1) of the type in question.

16 Claims, 2 Drawing Sheets

SPROCKET WITH ALTERNATING PITCH SPACING

The present invention relates to a sprocket, in particular for a timing chain drive, with a circular gear ring comprising a plurality of alternating teeth and tooth spaces distributed around the periphery of the gear ring, and different pitch spacings. The invention additionally relates to a corresponding timing chain drive, in particular a timing chain drive with a driving chain and at least one sprocket of the type in question.

In the development of motor vehicles, the NVH behaviour (noise, vibration and harshness) becomes increasingly important. In addition to the customers' wishes for high vibration comfort, a lower noise and vibration load on the driver will also contribute to active security. Furthermore, in particular the vibration loads impair the service life and the necessary dimensioning of the components in question.

In a motor vehicle a large number of components act simultaneously as excitation sources for vibrations and noise. These components are, in addition to the internal combustion engine itself, the power train, the transmission, the fan, the intake system, the exhaust gas system as well as the tires and the chassis, the noise and vibrations originating from the individual noise and vibrations sources being not negligible. However, the vibration and noise excitations of the power train, e.g. rotational vibrations of the crankshaft and of the camshaft, irregular rotary motions of the flywheel, bearing loads as well as angular speed variations and torque excitations of the crankshaft, play a dominant role in this respect. These dynamic loads of the power train, especially of a timing chain drive used for internal combustion engines and consisting of a crankshaft chain wheel, at least one camshaft chain wheel and a driving chain, propagate dominantly throughout the whole vehicle and superimpose themselves on all the other noise and vibration sources.

The reduction of dynamic loads in the power train, regardless of whether a toothed belt or a toothed chain is used for the purpose of driving, has been one of the top priorities in the field of internal combustion engine development for many years. DE 37 39 336 C2, for example, discloses that rotational vibrations are counteracted by the use of a vibration absorber, which, however, entails substantial additional expenditure and necessitates a substantial amount of additional installation space. DE 39 20 528 C1 suggests that the alternating torques originating from the camshaft should be counteracted by a hydraulic brake unit. DE 195 20 508 A1 describes, for a toothed belt drive, a non-circular pulley which is used as a camshaft pulley so as to reduce the excitation of vibrations. The non-circular pulley shown in this publication has four projecting and four non-projecting areas which are arranged around the pulley at regular intervals. In addition, JP 10266868 A discloses an oval crank-shaft pinion for a toothed-belt timing drive. DE 202 20 367 U1 and DE 203 19 172 U1 additionally describe the development of a synchronous drive unit, which is not limited to toothed belts and which reduces the dynamic load of the power train through an opposite, fluctuating corrective torque by means of a non-circular profile, in particular an elliptical profile, of at least one toothed belt wheel.

Load-reduced timing chain drives are also known e.g. from EP 097 041 B1 and from EP 1 308 646 A2. The tooth spaces of a sprocket are here displaced, as regards their root circle diameter, i.e. their radial position, in comparison with a conventional uniform root circle. In this way, the radial engagement positions of the chain links between the sprocket teeth are varied, whereas the pitch spacing between the meshing chain links remains constant. The arrangement of the tooth space root circle diameters is either randomly distributed or it is selected with respect to a uniform control chain load.

In addition, DE 43 31 482 A2 discloses a chain drive comprising a chain which consists of chain links of different lengths, and sprockets having correspondingly different tooth pitches. The reduction of the repetition sequence of the engagement of the chain with the teeth of the sprocket reduces the periodic vibration excitation and the noise emission of the chain drive. Due to the different lengths of the chain links, the different tooth pitches on the sprocket are arranged in an ever recurring arrangement. It is true that, by means of this chain drive, the vibration energy is distributed to three frequencies, but the production of the sprocket and of the chain consisting of chain links of different lengths are expensive and susceptible to assembly faults, in particular in the case of an exchange of components.

Many of the solutions known from the prior art for reducing the noise and vibration load of the power train proved to be useful in the course of their use. The present intensive efforts to improve the NVH behaviour in motor vehicles still further necessitate additional development efforts, in particular also in the case of the dominant noise and vibration source of the power train. In addition, the dynamic load on the drive is still comparatively high when the hitherto available solutions are used. A further load reduction in the timing drive is therefore desirable and, through the downsizing effects, it could also lead to a reduction of costs in the sphere of the timing drive.

It is therefore the object of the present invention to reduce the dynamic load in the power train, in particular in a timing chain drive, and to avoid the disadvantages of known solutions while achieving an identical or only slightly reduced efficiency.

In the case of a sprocket of the type in question, this object is achieved in that a plurality of successive pitch spacings, preferably at least three, increase continuously over a first region of the circular gear ring, and a plurality of successive pitch spacings, preferably at least three, decrease continuously in a subsequent region of the circular gear ring. The continuous change of the pitch spacing can be of a uniform as well as of a non-uniform nature, the most expedient pitch spacing profile being, in principle, a sinusoidal profile. However, also a steplike pitch spacing form comprising two respective steps may already suffice to produce a positive effect. The regions with continuously increasing and continuously decreasing pitch spacings can have arranged between them regions with a constant pitch spacing, e.g. of the mean pitches. Preferably, the alternating regions are, however, arranged such that they adjoin one another so as to achieve a pitch spacing profile that produces the best possible positive effect.

This alternating arrangement of the different pitch spacings on the gear ring in the direction of rotation of the sprocket causes in the timing chain drive an additional vibration excitation, which is opposed to the vibration load, whereby the chain forces occurring in the timing chain drive will be reduced. The provision of this effective additional excitation of the timing drive in such a form that it will occur in the area of resonant locations causes a substantial reduction of the chain forces and allows thus not only an improvement of the NVH behaviour but also a smaller dimensioning of the timing chain drive without altering the performance and the conditions of use.

According to a preferred embodiment, regions of the gear ring with continuously increasing pitch spacings and regions of the gear ring with continuously decreasing pitch spacings can be arranged in alternate succession so as to achieve the most uniform possible reduction of the chain forces in a timing chain drive.

An advantageous embodiment of the sprocket itself or of the sprocket as part of a chain drive is so conceived that the gear ring regions with continuously increasing pitch spacings and/or continuously decreasing pitch spacings comprise at least four different pitch spacings. The stepwise change of the pitch spacings allows a vibration excitation that builds up slowly, i.e. a slow increase or a partial compensation of the chain force induced by the sprocket in the timing chain drive.

An expedient embodiment of the sprocket is so conceived that the difference between the largest pitch spacing and the smallest pitch spacing is not more than 35%, preferably not more than 15%, of the largest pitch spacing. This limitation of the different pitch spacings still allows satisfactory or good smooth running characteristics of the sprocket as such, or of a sprocket used in a chain drive according to the present invention, with a well-balanced ratio to the opposed vibration excitation and the load reduction of the chain drive.

In order to allow, in comparison with non-circular sprockets, a reduction of the transversal excitation of the chain strands, the root circle of the gear ring can have a circular profile, so that the respective tooth spaces have the same root circle radius. For achieving a circular gear ring profile which is as uniform a possible, in spite of the different pitch spacings, the addendum circle of the gear ring can have a circular profile so that also the teeth have the same addendum circle radius.

The present invention additionally relates to a chain drive, in particular a timing chain drive, comprising a driving chain and at least one sprocket with a circular gear ring comprising a plurality of alternating teeth and tooth spaces distributed around the periphery of the gear ring, and different pitch spacings, a plurality of successive pitch spacings increasing continuously over a region of the circular gear ring, and a plurality of successive pitch spacings decreasing continuously in a subsequent, preferably adjoining region of the circular gear ring. In such a chain drive, an imparted vibration amplitude can be reduced to a substantial extent. Such a vibration amplitude is generated, e.g. in a timing chain drive, by the dynamic load on the chain drive introduced by the internal combustion engine. A sprocket with different pitch spacings arranged on the crankshaft can introduce in the timing chain drive a vibration which causes a vibration superposition especially in the resonance range of the engine excitation, a reduction of the chain forces and of the resonance vibrations being realized by means of said vibration superposition through extinction effects. The vibration superposition can be adapted to the resonance range of the internal combustion engine in advance by means of simulation. However, the different pitch spacings of the gear ring also cause a shift of the angular position of the respective tooth spaces, an increase in the pitch spacings causing also an increase in the angle between two adjoining tooth centre lines or tooth space centre lines. By means of suitably adapted spacings, which are preferably calculated by means of a simulation, the different pitch spacings and the angular displacement between the tooth space angles can be adapted to an existing vibration characteristic.

For achieving good smooth running characteristics in combination with a well-balanced load reduction, the difference between the largest pitch spacing and the smallest pitch spacing may be not more than 35%, preferably not more than 15%, of the largest pitch spacing. When a conventional driving chain is used, which comprises a plurality of chain links having an essentially identical chain pitch, the different pitch spacings are preferably smaller than or identical to the chain pitch. However, when the driving chain is carefully designed so as to avoid constraining forces, pitch spacings which are larger than the chain pitch may be provided as well. In the case of a driving chain having an identical chain pitch, standard chains can be used, e.g. roller chains or articulated chains, which allow not only a reasonably-priced production but also easy assembly without defined chain positions. Pitch spacings which are smaller than or identical to the chain pitch of the associated driving chain prevent the chain from jamming on the teeth and, consequently, also the generation of constraining forces.

A preferred embodiment is so conceived that an engagement perimeter of the chain on the gear ring of the sprocket defines a non-circular profile. The engagement perimeter is defined by a curved line interconnecting the points of contact of the chain or the positions of the hinge axes of the chain in its engaged condition. Such a non-circular profile of the engagement perimeter of the chain is created, in spite of the fact that the gear ring is circular in shape, by the way in which the different pitch spacings are arranged in accordance with the present invention.

In the following, the present invention will be explained in detail on the basis of an embodiment.

Figure 1:
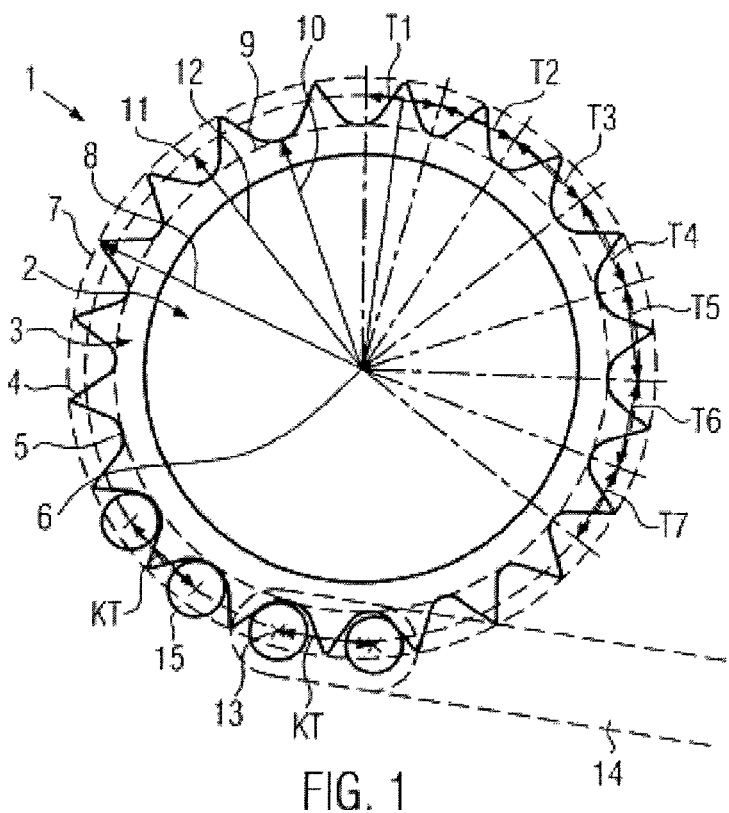
FIG. 1 shows a top view of a sprocket according to the present invention.
Figure 1A:
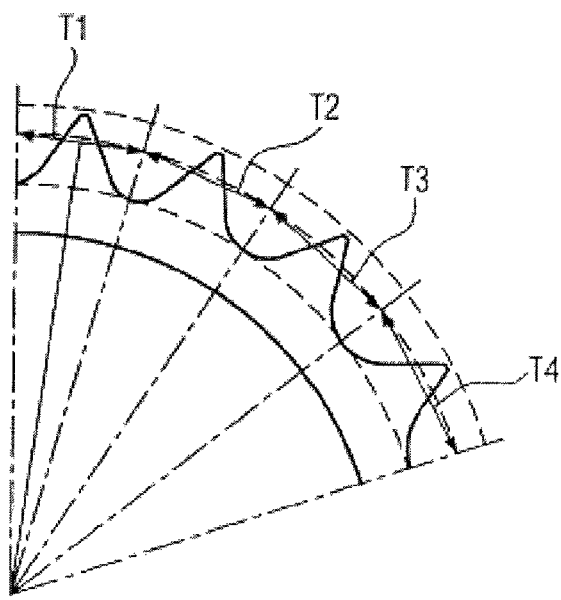
FIG. 1a shows a detail view of the sprocket shown in FIG. 1

FIG. 1 shows a view of a sprocket 1 according to the present invention, which comprises a hub portion 2 and a circular gear ring 3. The gear ring 3 has arranged thereon a plurality of alternating teeth 4 and tooth spaces 5 distributed around the periphery of the gear ring 3. The centre 6 of the sprocket 1 is also the axis of rotation thereof.

The curved circumference described around the tips of the teeth 4 defines the addendum circle 7 of the sprocket 1, the addendum circle radius 8 being the distance between the tip of a tooth 4 and the centre 6. Likewise, the root circle 9 of the sprocket 1 is defined by the curved circumference extending through the respective lowermost area of the tooth spaces 5. The root circle radius 10 is accordingly the distance between the lowermost points of the tooth spaces 5 and the centre 6 of the sprocket 1.

The pitch circle 11 and the pitch circle radius 12 of the sprocket 1 are here defined by the curved line connecting the positions of the individual chain link axes 13 of a driving chain 14, which is here a roller chain, in the tooth space 5 independently of the chain 14 and its chain pitch KT between adjoining chain links, i.e. at an optimum position of the individual chain link or roller 15 in the tooth space 5. Figuratively, the pitch circle 11 is defined by the curved line connecting the chain link axes 13 of rollers 15 or sleeves, which are loosely placed in the tooth spaces 5 without being connected to one another. All the tooth spaces 5 have substantially the same size and the rollers 15 are arranged at an optimum position relative to the tooth spaces 5. Accordingly, the pitch circle radius 12 is then the distance between the independent position of the chain link axis 13 in the tooth space 5 and the centre 6 of the sprocket 1. Also the pitch spacing T of the sprocket 1 is obtained in this way, said pitch spacing T resulting from the linear distance between the independent position of the axis 13 of a chain link in the tooth space 5 and from the independent position of the chain link axis 13 in the subsequent tooth space 5. In the case of a uniform shape of the tooth space 5, i.e. a mirror-inverted shape of the tooth space flanks, the pitch spacing T also results from the distance between the points of intersection of the tooth space bisectors of two adjoining tooth spaces 5 with the pitch circle 11 of the sprocket 1. When the driving chain 14 is implemented as a toothed chain, the pitch circle 11 and the pitch circle radius 12 result from the points of contact of the teeth of the toothed chain with the flanks of the tooth spaces 5.

The sprocket 1 shown in FIG. 1 has different pitch spacings T1 to T7. In a first region (T1 to T4) of the circular gear ring 3, the pitch spacings T1 to T4 increase continuously. In addition to a uniform increase for a uniform increase in the chain force, also a non-uniform increase is possible in the case of a special form of the desired chain force increase. In the subsequent region (T5 to T7) of the gear ring 3, the pitch spacings T5 to T7 decrease continuously. It follows that T1 is smaller than T2, T2 is smaller than T3 and T3 is smaller than T4. Likewise, T5 is larger than T6 and T6 is larger than T7. The adjoining pitch spacings T4 and T5 can both be approximately equally sized, or T5 is smaller than T4 so that the pitch spacing T4 can also be regarded as a part of the second continuously decreasing region of the gear ring 3. The different pitch spacings of the sprocket 1 also result in different angles between the tooth space bisectors of the associated tooth spaces, so that the decrease and increase of the pitch spacings T1 to T7 can analogously also be defined by means of the different angles of the tooth space bisectors.

In spite of the different pitch spacings T1 to T7, the respective tooth spaces 5 are identical in size and shape. It follows that the change of the pitch spacings only has an effect on the dimensions of the teeth 4, which continuously increase and decrease together with the pitch spacings. Hence, the tooth spaces 5 shift as the pitch spacings and the angles of the tooth space bisectors change.

In comparison with a conventional sprocket for use with a driving chain 14 with a chain pitch KT, the sprocket 1 according to the present invention is so conceived that not only its pitch circle 11 is smaller in circumference but also its addendum circle 7 and its root circle 9 are smaller in size. It follows that the circular gear ring 3 of the sprocket 1 in its entirety has smaller circumferential dimensions.

Figure 2:
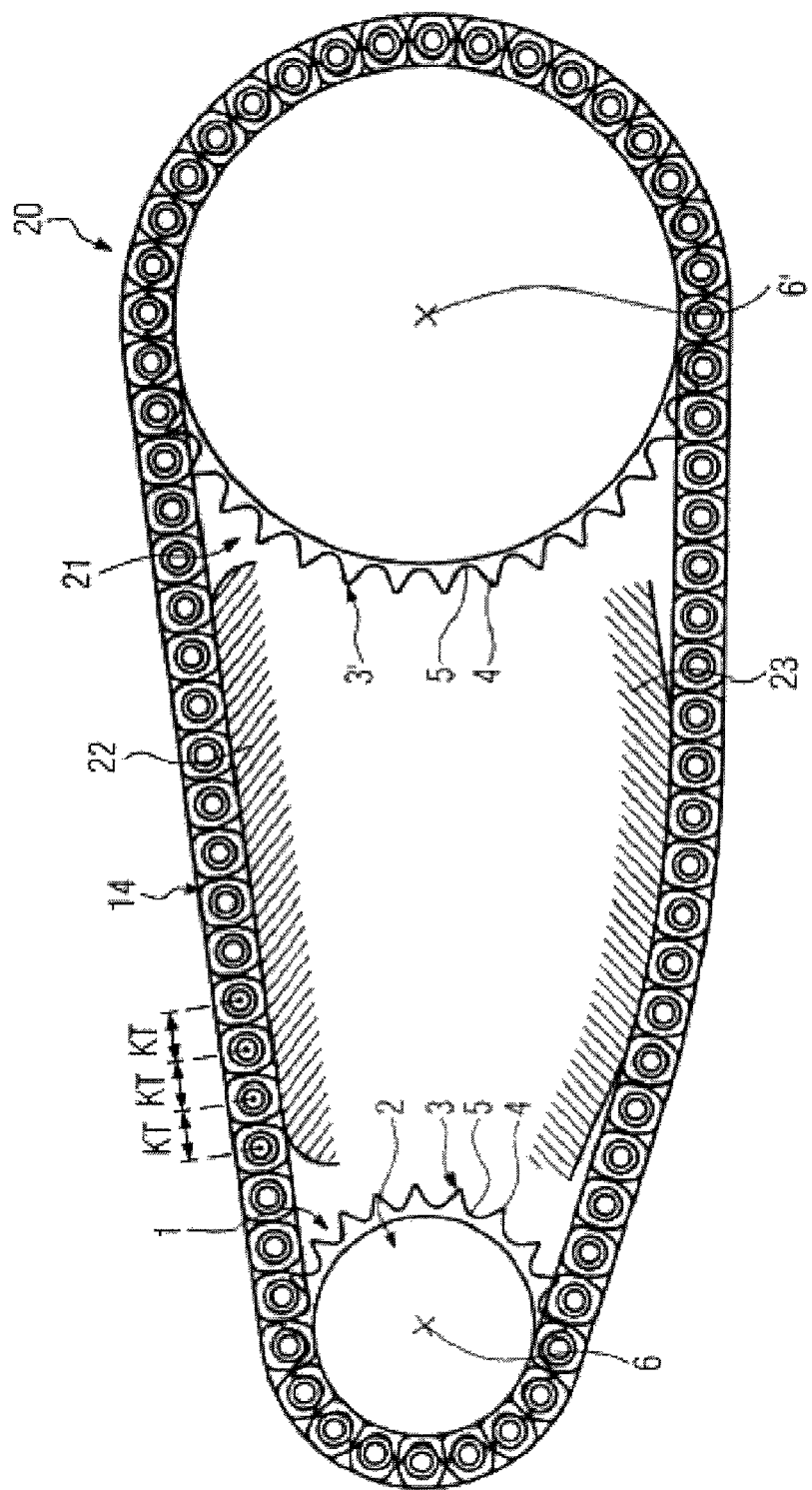
FIG. 2 shows a top view of a chain drive with two sprockets according to the present invention.

FIG. 2 shows a simple chain drive 20 with two sprockets 1, 21 and an endless driving chain 14, which is placed around the sprockets 1, 21. On the load side of the driving chain a guide rail 22 is provided, which supports the driving chain 14 between the sprockets 1, 21. On the no-load side of the driving chain 14, an additional tensioning rail 23 is provided, which applies to the driving chain 14 an outwardly directed constant pretension. For applying said pretension, the tensioning rail 23 is suitably supported (not shown) and connected to a tensioning device (not shown).

The schematic chain drive 20 shown in FIG. 2 can act as a minimum timing chain drive of a four-cylinder internal combustion engine. The smaller sprocket 1 is connected to the crank-shaft (not shown) of the internal combustion engine and the larger sprocket 21 is connected to the camshaft (not shown) of the internal combustion engine.

The crankshaft sprocket 1 is provided with a circular gear ring 3 arranged around the centre 6 of the sprocket and comprising juxtaposed teeth 4 and tooth spaces 5, the successive pitch spacings increasing continuously over a first region of the gear ring according to the present invention and decreasing continuously in an adjoining region. The camshaft sprocket 21 is provided with a gear ring 3' which is also circular and which is circularly arranged around the centre 6' of the sprocket 21. The gear ring 3' of the camshaft sprocket 21 has, in comparison with the crankshaft sprocket 1, twice as many teeth 4 and tooth spaces 5.

During operation, the rollers or sleeves of the driving chain 14 of the chain drive 20 according to the present invention engage the tooth spaces 5 of the sprocket 1, said driving chain 14 being here implemented as a link chain or sleeve-type chain. Preferably, the chain pitch KT between the hinge axes 13 of the chain links of the driving chain 14 is uniform over the length of the chain. If necessary, a low-noise random chain having slightly different chain pitches may, however, be used as well. The different pitch spacings T1 to T7 of the sprocket 1 differ from the chain pitch KT or a mean chain pitch of the driving chain 14. In addition to pitch spacings which correspond approximately to the chain pitch KT, i.e. the nominal value of conventional sprockets, the sprocket is also provided with smaller pitch spacings T. Also larger pitch spacings are, in principle, possible, but the effect produced by such larger pitch spacings in comparison with the nominal pitch is negligible. Moreover, when the pitch spacings are excessively large in comparison with the chain pitch KT, constraining forces are generated through which the chain 14 will be jammed by the teeth 4 of the sprocket, so that larger pitch spacings only make sense to a very small extent and only with a limited oversize. In comparison with a mean pitch spacing, the pitch spacings T1 to T7 normally vary, per se, by not more than ±5%. A technical operability is additionally given up to approx. ±20%.

When a chain link engages a tooth space 5 with a smaller pitch, e.g. T1 to T3, T6 and T7, the chain 14 will run on an engagement perimeter which is slightly larger than the pitch circle 11, since the chain link cannot enter the tooth space 5 freely and independently but only in combination with the adjoining chain links of the driving chain 14. When the pitch spacing T of the tooth spaces 5 approaches the nominal value of the chain pitch KT of the driving chain, also the engagement perimeter will again approach the nominal pitch circle 11 predetermined by the tooth spaces 5. When the pitch spacing T reaches the value of the chain pitch KT, the pitch circle 11 and the engagement perimeter of the chain 14 will correspond. When the pitch spacing T is larger than the chain pitch KT, the engagement perimeter will again correspond to the pitch circle 11.

The structural design of the sprocket 1 itself or of the sprocket as part of a chain drive 20 according to the present invention causes, due to the continuous increase of successive pitch spacings in a first region of the gear ring and the continuous decrease of the pitch spacings in an adjoining region, a non-circular profile of the engagement perimeter of the chain 14 on the circular gear ring 3 of the sprocket 1. The non-circular profile of the engagement perimeter causes, due to the different chain forces imparted to the driving chain 14, a vibration excitation of the chain drive which, in the case of an existing vibration excitation of the chain drive, which may e.g. be a timing chain drive of an internal combustion engine, can be utilized for extinction by means of superimposed vibrations. Such an oppositely directed chain drive excitation, which is preferably configured for the resonance vibration range, can be used for substantially reducing the chain force acting on the driving chain 14. The extinction effects caused by superimposed vibrations will also reduce the noise created by the chain drive 20, in particular in the resonance range. It follows that a sprocket 1 according to the present invention allows not only an improvement of the NVH behaviour but also a downsizing of the timing drive for an internal combustion engine. Other than in the case of the non-circular sprockets known in the prior art, such a sprocket 1 according to the present invention will reduce the transversal excitation of the chain strands.

The optimum sequence of the various pitch spacings, the sequence of the pitch spacings in the various areas of the gear ring and the arrangement of the regions of increasing and decreasing pitch spacings over the periphery of the gear ring as well as the decision on uniformly or non-uniformly varying pitch spacings in the respective regions of the gear ring can, by means of a simulation, be suitably adapted to one another in such a way that, especially in the resonance range of the chain drive 20, the best possible vibration superposition will be obtained, so that the resultant extinction effects will be produced preferably in the ranges of maximum vibration and noise excitation.

The invention claimed is:

1. A sprocket for a timing chain drive, with a circular gear ring comprising a plurality of alternating teeth and tooth spaces arranged around the periphery of the gear ring, and different pitch spacings,
    wherein at least three successive pitch spacings increase continuously over a first region of the gear ring, and wherein at least three successive pitch spacings decrease continuously in a subsequent region of the gear ring.

2. A sprocket according to claim 1, wherein the first region of the gear ring and the subsequent region of the gear ring adjoin one another.

3. A sprocket according to claim 1, wherein regions of the gear ring with continuously increasing pitch spacings and regions of the gear ring with continuously decreasing pitch spacings are arranged in alternate succession.

4. A sprocket according to claim 1, wherein the regions of the gear ring with continuously increasing pitch spacings or with continuously decreasing pitch spacings comprise at least four different pitch spacings.

5. A sprocket according to claim 1, wherein the difference between the largest pitch spacing and the smallest pitch spacing is not more than 15% of the largest pitch spacing.

6. A sprocket according to claim 1, wherein a root circle of the gear ring has a circular profile.

7. A sprocket according to claim 1, wherein the addendum circle of the gear ring has a circular profile.

8. A timing chain drive comprising a driving chain and at least one sprocket with a circular gear ring comprising a plurality of alternating teeth and tooth spaces arranged around the periphery of the gear ring, and different pitch spacings,
    wherein at least three successive pitch spacings increase continuously over a first region of the gear ring, and wherein that at least three successive pitch spacings decrease continuously in a subsequent region of the gear ring.

9. A timing chain drive according to claim 8, wherein the first region of the gear ring and the subsequent region of the gear ring adjoin one another.

10. A timing chain drive according to claim 8, wherein regions of the gear ring with continuously increasing pitch spacings and regions of the gear ring with continuously decreasing pitch spacings are arranged in alternate succession.

11. A timing chain drive according to claim 8, wherein the regions of the gear ring with continuously increasing pitch spacings or with continuously decreasing pitch spacings comprise at least four different pitch spacings.

12. A timing chain drive according to claim 8, wherein the difference between the largest pitch spacing and the smallest pitch spacing is not more than 15% of the largest pitch spacing.

13. A timing chain drive according to claim 8, wherein a root circle of the gear ring has a circular profile.

14. A timing chain drive according to claim 8, wherein the addendum circle of the gear ring has a circular profile.

15. A timing chain drive according to claim 8, wherein the driving chain comprises a plurality of chain links having essentially the same chain pitch.

16. A timing chain drive according to claim 15, wherein the various pitch spacings of the gear ring are smaller than or identical to the chain pitch.

* * * * *